June 19, 1945.  LE ROY B. HOUSE  2,378,633
DENTAL FLASK
Filed July 11, 1944
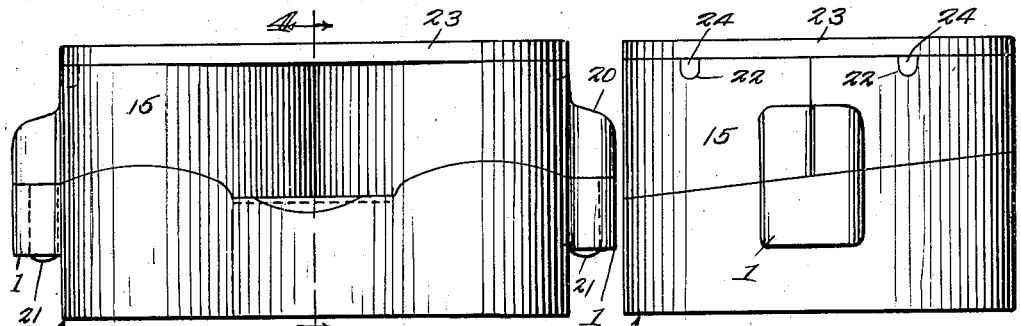
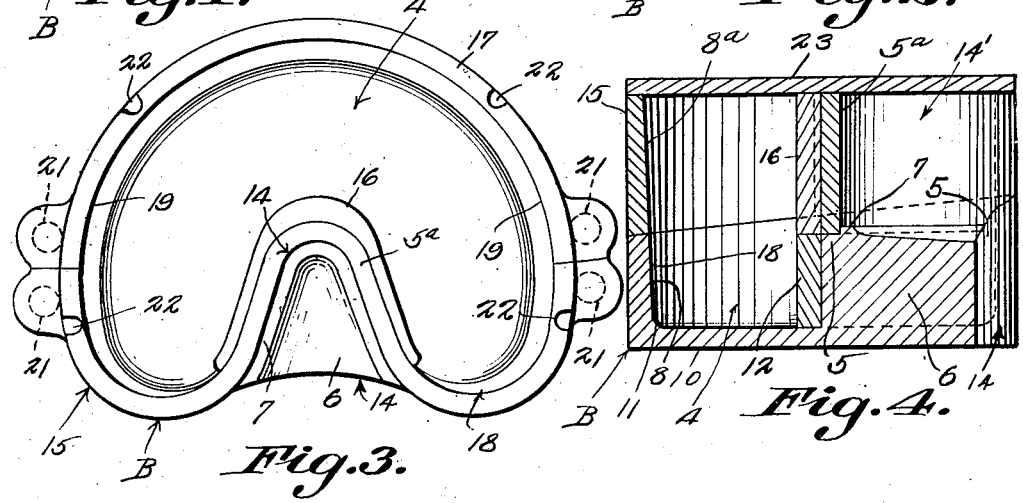
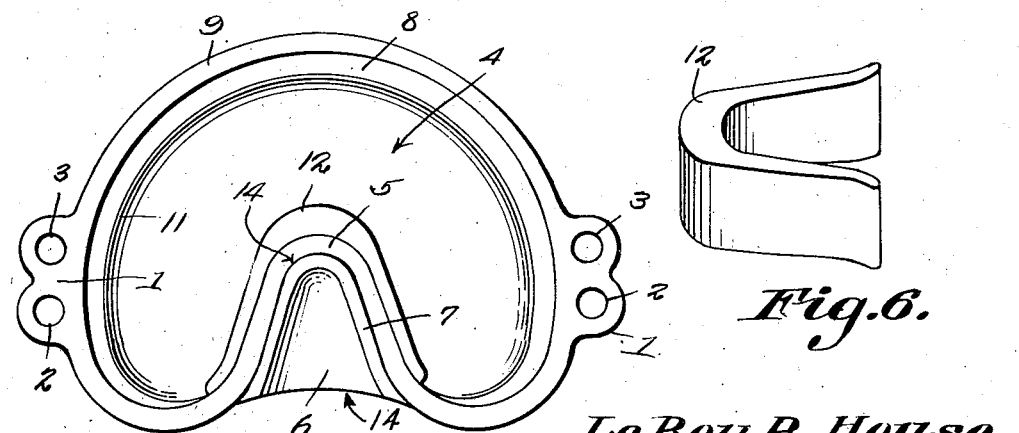
LeRoy B. House
INVENTOR.
BY *Chrowles*
ATTORNEYS.

Patented June 19, 1945

2,378,633

UNITED STATES PATENT OFFICE 2,378,633

DENTAL FLASK

Le Roy B. House, Herrin, Ill.

Application July 11, 1944, Serial No. 544,417

1 Claim. (Cl. 18—33)

The device forming the subject matter of this application is a flask, adapted to be used in the making of a lower denture.

The invention aims to provide a flask for molding and curing plastic materials to form a lower denture of such perfection that porosity, pits, voids and so forth will be eliminated from the lingual surface of the denture, this being accomplished by creating, on the lingual surface, the same conditions of flow, temperature, and pressure as exists on the buccal and labial surface, stagnation of material being avoided.

The invention aims, further, to provide a flask which can be detached from the investment material without having to cut and dig the case out of the flask.

Within the scope of what is claimed, the structure described and shown may be changed, without departing from the spirit of the invention.

In the accompanying drawing:

Fig. 1 shows in elevation, a dental flask constructed in accordance with the invention.

Fig. 2 is a side elevation;

Fig. 3 is a top plan, the lid having been removed;

Fig. 4 is a section on the line 4—4 of Fig. 1.

Fig. 5 is a top plan of the base;

Fig. 6 is a perspective showing one of the fillers.

The flask forming the subject matter of this application comprises a horizontal base B, preferably made in one piece, the base being provided on opposite sides with outwardly extended lugs 1 having vertical openings or seats 2 and 3 which may be tapered if desired. The base B is substantially U-shaped in top plan, as Figs. 3 and 5 will disclose. The base B is provided with an upwardly-opening, U-shaped recess 4.

The base B has an external, laterally-opening concavity 14, which is substantially filled vertically by a solid portion 6, integral with the base, the outer portion of the cavity being open. On the upper surface of the solid portion 6 there is an upstanding, U-shaped rib 7 of small height, as shown in Fig. 4.

The upstanding wall 9 of the base B includes an inwardly extended portion 5 which defines the aforesaid concavity 14. The inner surface of the part 5 is disposed substantially at right angles to the upper surface of the bottom 10 of the base B, but the remainder of the inner surface of the wall 9 has an upward flare, shown at 8 in Fig. 4. Where the inner surface of the wall 9 joins the upper surface of the bottom 10, on each side of the part 5 of the wall, there is an arcuate surface 11. The taper shown at 8, and the arcuate surface 11, facilitate the removal of the case (not shown).

The numeral 12 marks a U-shaped filler, supported on the bottom 10, and shaped to fit closely, but removably about the part 5 of the wall 9 of the base B. The filler 12, as shown in Fig. 6, is of greatest thickness in its intermediate portion and tapers in thickness toward the ends of its diverging arms.

On the wall 9 of the base B, the body 15 of the flask is seated, in lateral engagement with the rib 7. The body 15 is shaped like the base but has no part corresponding to the solid portion 6 of the base. Parts of the base B hereinbefore described, and duplicated in the body 15, are designated by numerals already used, with the suffix "a", the concavity 14' of the body being open throughout its entire extent.

A filler 16, corresponding to the filler 12, is supported on the filler 12 and receives the part 5a of the body of the flask.

The body 15 of the flask comprises horizontally separable parts 17 and 18, supplied near their places 19 of end abutment with outstanding lugs 20, having depending pins 21. The pins 21 of the part 18 are received in the seats 2 of the base B, the corresponding pins of the part 17 being received in the seats 3, to hold the constituent members 17 and 18 of the body in the position shown in Fig. 3. The parts 17 and 18 of the body 15 have seats 22.

The body 15 is surmounted by a lid 23, having depending projections 24 received in the seats 22, to hold the lid in place for upward removal, but against lateral displacement.

As has been stated hereinbefore, the flask is adapted to mold and cure plastic materials to form a lower denture, porosity, pits, and voids being avoided and on the lingual surface of the lower denture. The flask operates to create, on the lingual surface, the same condition of flow, temperature, and pressure as exists on the buccal and labial surface, and eliminates stagnation of material, a better lower denture being the consequence. These results are accomplished by the employment of the fillers 16 and 12, especially in combination with other parts shown and described. The fillers, moreover, reduce investment bulk, and help to regulate temperature. They serve, also, to adapt the flask to the making of various sizes of lower dentures, and to facilitate the removal of the denture from the investment. The solid portion 6 of the base B aids in regulating the temperature in the central portion of the flask.

Various explanations have been made as to why porosity, pits, voids and the like are found on the lingual surface of the denture. They do not occur on the labial and buccal surface thereof. It is my belief that the defects referred to result from a lack of freedom of flow and too much heat. Freedom of flow and a proper temperature are promoted by the fillers 12 and 16 and by the solid portion 6 of the base B of the flask. The flask may be opened and closed readily, and a proper temperature is maintained, a free out-flow of surplus material occurring when the flask is put under pressure. The places 19 of abutment between the parts 17 and 18 of the body 15 are at the widest part of the flask, and, therefore, the removal of the members 17 and 18 is facilitated.

What is claimed is:

In a flask for use in the pressing and curing of lower dentures, a hollow, horizontal base having an inwardly-extended portion giving the base a substantially U-outline in top plan, a body of like outline supported removably on the base, the inwardly-extended portions defining vertically-registering, external, laterally-opening concavities in the margin of the base and in the margin of the body, the concavity of the body being open, throughout its entire extent, the base including a solid portion which substantially fills its concavity, vertically, the outer portion of the concavity of the base being open a substantially U-shaped filler removably mounted in the base and fitting closely about the inwardly-extended portion thereof, and a correspondingly-shaped filler supported on the filler of the base and extended into the body, the supported filler fitting closely but removably about the inwardly-extended portion of the body.

LE ROY B. HOUSE.